US008112394B2

(12) United States Patent
Shringi et al.

(10) Patent No.: US 8,112,394 B2
(45) Date of Patent: Feb. 7, 2012

(54) LONG-LIVED DATA TRANSACTIONS

(75) Inventors: Kanchan Shringi, Redwood City, CA (US); Min Lu, Fremont, CA (US); Xiaopei (Joyce) Zhang, Foster City, CA (US); Siemel Naran, San Francisco, CA (US); Rahim Yaseen, Redwood City, CA (US); Jon Rexford Degenhardt, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 325 days.

(21) Appl. No.: 11/525,680

(22) Filed: Sep. 22, 2006

(65) Prior Publication Data

US 2007/0239798 A1 Oct. 11, 2007

Related U.S. Application Data

(60) Provisional application No. 60/727,016, filed on Oct. 14, 2005, provisional application No. 60/727,248, filed on Oct. 14, 2005.

(51) Int. Cl.
*G06F 17/30* (2006.01)

(52) U.S. Cl. ........................................ 707/634; 707/802

(58) Field of Classification Search .................. 707/101, 707/634, 802
See application file for complete search history.

(56) References Cited

U.S. PATENT DOCUMENTS

| | | | | |
|---|---|---|---|---|
| 5,524,241 A | * | 6/1996 | Ghoneimy et al. | 707/10 |
| 5,684,998 A | * | 11/1997 | Enoki et al. | 713/310 |
| 6,122,640 A | * | 9/2000 | Pereira | 707/648 |
| 6,671,716 B1 | * | 12/2003 | Diedrichsen et al. | 707/E17.119 |
| 6,918,053 B1 | * | 7/2005 | Thatte et al. | 714/16 |
| 7,231,397 B2 | * | 6/2007 | Madhavarapu et al. | 707/101 |
| 7,315,826 B1 | | 1/2008 | Guheen et al. | 705/7 |
| 7,548,898 B1 | * | 6/2009 | Tarenskeen et al. | 707/1 |
| 2001/0044751 A1 | * | 11/2001 | Pugliese et al. | 705/26 |
| 2002/0078058 A1 | * | 6/2002 | Bird et al. | 707/100 |
| 2002/0111949 A1 | * | 8/2002 | Barga et al. | 707/10 |
| 2003/0204503 A1 | | 10/2003 | Hammer et al. | 707/6 |
| 2004/0015851 A1 | * | 1/2004 | Newhook et al. | 717/116 |
| 2004/0054644 A1 | * | 3/2004 | Ganesh et al. | 707/1 |
| 2004/0181560 A1 | * | 9/2004 | Romanufa et al. | 707/202 |
| 2004/0181775 A1 | * | 9/2004 | Anonsen et al. | 717/104 |
| 2004/0255182 A1 | * | 12/2004 | Lomet et al. | 714/2 |
| 2005/0038687 A1 | | 2/2005 | Galdes | 705/9 |
| 2005/0149376 A1 | | 7/2005 | Guyan et al. | 705/9 |
| 2005/0160398 A1 | | 7/2005 | Bjornson et al. | 717/104 |
| 2005/0187983 A1 | * | 8/2005 | Narang et al. | 707/200 |
| 2005/0193286 A1 | * | 9/2005 | Thatte et al. | 714/48 |
| 2005/0198564 A1 | * | 9/2005 | Sinzig et al. | 715/507 |
| 2005/0262112 A1 | | 11/2005 | Moore | 707/100 |
| 2006/0095274 A1 | | 5/2006 | Phillips et al. | 705/1 |
| 2006/0143034 A1 | | 6/2006 | Rothermel et al. | 705/1 |
| 2006/0288014 A1 | * | 12/2006 | Edwards et al. | 707/100 |
| 2007/0038963 A1 | | 2/2007 | Moore | 715/859 |

OTHER PUBLICATIONS

Noyes, "System.Transactions and connection pooling", http://briannoyes.net/2005/09/14/SystemTransactionsAndConnectionPooling.aspx, Sep. 14, 2005.*

(Continued)

*Primary Examiner* — Son T Hoang
(74) *Attorney, Agent, or Firm* — Campbell Stephenson LLP

(57) ABSTRACT

In one embodiment, a method for facilitating long-lived data transactions includes starting a data transaction during a first user session, storing data associated with the data transaction in a temporary storage table, and ending the data transaction during a second user session using contents of the temporary storage table.

20 Claims, 11 Drawing Sheets

OTHER PUBLICATIONS

"SQL Server Books Online", http://web.archive.org/web/20040607020017/doc.ddart.net/mssql/sql2000/html/, Jun. 2004.*

"SQL As Understood by SQLite", http://web.archive.org/web/20050207124742/www.sqlite.org/lang_conflict.html, Feb. 2005.*

* cited by examiner

LONG-LIVED DATA TRANSACTIONS

RELATED APPLICATIONS

The present application claims priority to U.S. Provisional Application Ser. Nos. 60/727,016 and 60/727,248, both filed Oct. 14, 2005, which are incorporated herein in their entirety.

FIELD OF THE INVENTION

Embodiments of the present invention relate generally to data processing, and more particularly to providing a mechanism for long-lived data transactions.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2006, Oracle Corp., All Rights Reserved.

BACKGROUND OF THE INVENTION

A database transaction is a unit of interaction with a database management system (DBMS) or similar system that is treated in a coherent and reliable way independent of other transactions that must be either entirely completed or aborted. In database products, the ability to handle database transactions allows the user to ensure that integrity of a database is maintained.

A single database transaction may require several queries, each reading and/or writing information in the database. When the queries are executed, updates to the database are not visible to the outside world. When the database transaction is completed, a commit statement is executed, making the updates visible to the outside world. If one of the queries fails, the database system may rollback either the entire transaction or just the failed query. The transaction can also be rolled back manually at any time before the commit.

One of the key DBMS features is known as atomicity. Atomicity refers to the ability of the DBMS to guarantee that either all of the operations of a transaction are performed or none of them are. For example, the transfer of funds can be completed or it can fail for a multitude of reasons, but atomicity guarantees that one account will not be debited if the other is not credited as well. Typically, the DBMS uses locking to provide atomicity. In particular, the DBMS ensures that a lock is acquired anytime before processing data in a database, even on read operations. Maintaining a large number of locks, however, results in substantial overhead as well as hurting concurrency. If user A is running a transaction that has read a row of data that user B wants to modify, for example, user B must wait until user A's transaction is finished. In addition, database transactions can neither persist across session boundaries nor survive application server and database server restarts.

SUMMARY OF THE INVENTION

The present invention relates to various aspects of providing long-lived data transactions.

According to one aspect of the present invention, an exemplary method includes starting a data transaction during a first user session, storing data associated with the data transaction in a temporary storage table, and ending the data transaction during a second user session using contents of the temporary storage table.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1:
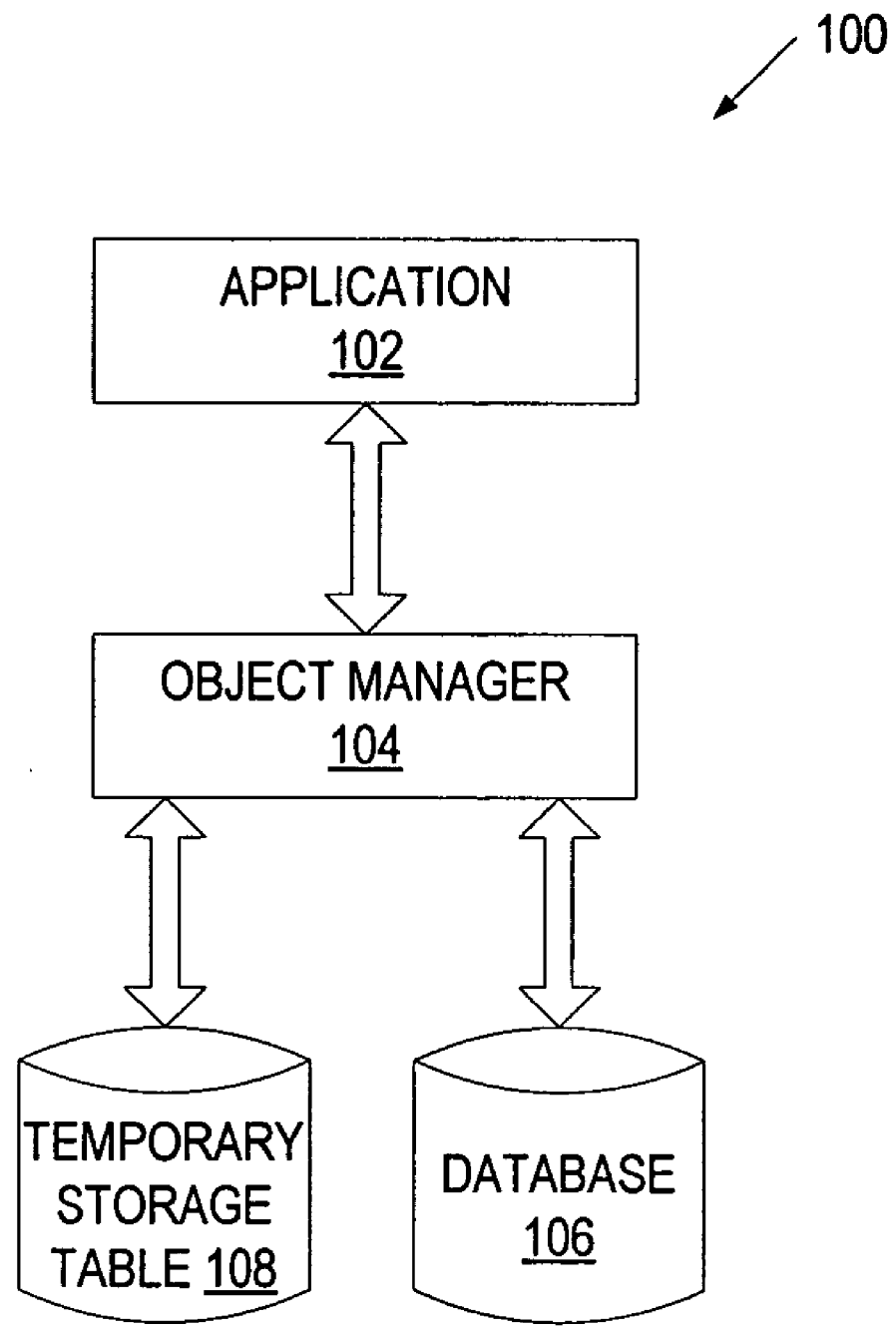
FIG. 1 is a block diagram of one embodiment of a system for facilitating long-lived data transactions.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, compact disc read-only memory (CD-ROMs), and magnetic-optical disks, read-only memories (ROMs), random access memories (RAMs), erasable programmamable read-only memory (EPROMs), eletrically erasable programmable read-only memory (EEPROMs), magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 is a block diagram of one embodiment of a system 100 for facilitating long-lived data transactions. The system 100 includes an application 102, an object manager 104, a temporary storage table 108, and one or more databases 106.

The application 102 may reside on an application server and be any software program or module that receives user requests to perform operations involving access of data stored in the database 106. Access of data may include, for example, a search for a specific portion of data stored in the database 106, an update of a specific record in the database 106, an insert of a new record into the database 106, a deletion of an existing record from the database 106, etc. The application 102 may allow end users to perform the above operations in the context of tasks, services or similar entities, collectively referred to herein as tasks. A task can span multiple user login sessions, process boundaries, and/or database and application server restarts.

The object manager 104 provides data management for the application 102. In one embodiment, the object manager 104 acts as a server towards multiple clients represented by application servers, including the application server hosting the application 102. Alternatively, the application server hosting the application 102 is the only client of the object manager 104.

In one embodiment, the object manager 104 supports transaction isolation for operations performed within the boundary of a task in a manner transparent to its client(s). In particular, the application 102 may be unaware of the database structure and may communicate with the object manager 104 by referring to data entities as business objects and business components. A business component associates data items defining a specific business entity (e.g., account, opportunity, etc.) into a single structure. This structure may correspond to a set of columns from one or more database tables. A business object combines related business components and defines a hierarchical relationship between these business components.

The object manager 104 allows data transactions requested by the application 102 to span multiple user sessions, process boundaries, and database and application server restarts. In particular, the object manager 104 can start a data transaction during a first user session and allow this data transaction to span multiple user sessions, until receiving a request from the application 102 to end the data transaction. For example, if a user pauses a task during a first user session, and then resumes it during a second user session, the object manager 104 allows a data transaction to persist across the second user session. In one embodiment, a data transaction may be associated with different users. That is, a data transaction may be shared by different users (e.g., if multiple users are authorized to access the same task instance). Alternatively, a data transaction may span multiple user sessions owned by different users (e.g., a first user may transfer a paused task to a different user who subsequently resumes it in a new user session).

The object manager 104 stores all changes occurring during the life of the data transaction in the temporary storage table 108. When the data transaction is completed, the object manager 104 may commit all data transaction changes to the database 106 or rollback the data transaction changes in the temporary storage table 108. The application 102 may also call the object manager 104 to set data savepoints and to rollback the data to one of these savepoints when necessary. In one embodiment, the object manager 104 associates changes pertaining to a specific data transaction using a task identifier provided by the application 102 for each requested data operation.

In one embodiment, if the application 102 issues a data retrieval request within the task (e.g., for a user running the task), the object manager 104 updates results obtained from the database 106 with results obtained from the temporary storage table 108 to reflect changes made since the task has started. Alternatively, if the application 102 issues a data retrieval request outside the task, the object manager 104 provides only the results obtained from the database 106.

In one embodiment, the object manager 104 maps columns of the temporary storage table 108 to columns of the tables in the database 106. In one embodiment, the objects manager 104 stores the mappings in a designated mapping table.

A record may be modified within the task as well as outside the task. In one embodiment, the behavior of the object manager 104 on data retrieval or final commit of such records to the database 106 is configurable. In particular, based on a predefined configuration parameter, the object manager 104 may either abort or accept the changes made within the task. This flexibility is important for the application 102 as it allows the application 102 to decide if overwriting with updates from the task is the right thing for the scenario or not.

Accordingly, the system 100 provides a transaction mechanism enabling long-lived data transactions that can span login sessions, process boundaries, and database or application server restarts.

Figure 2:
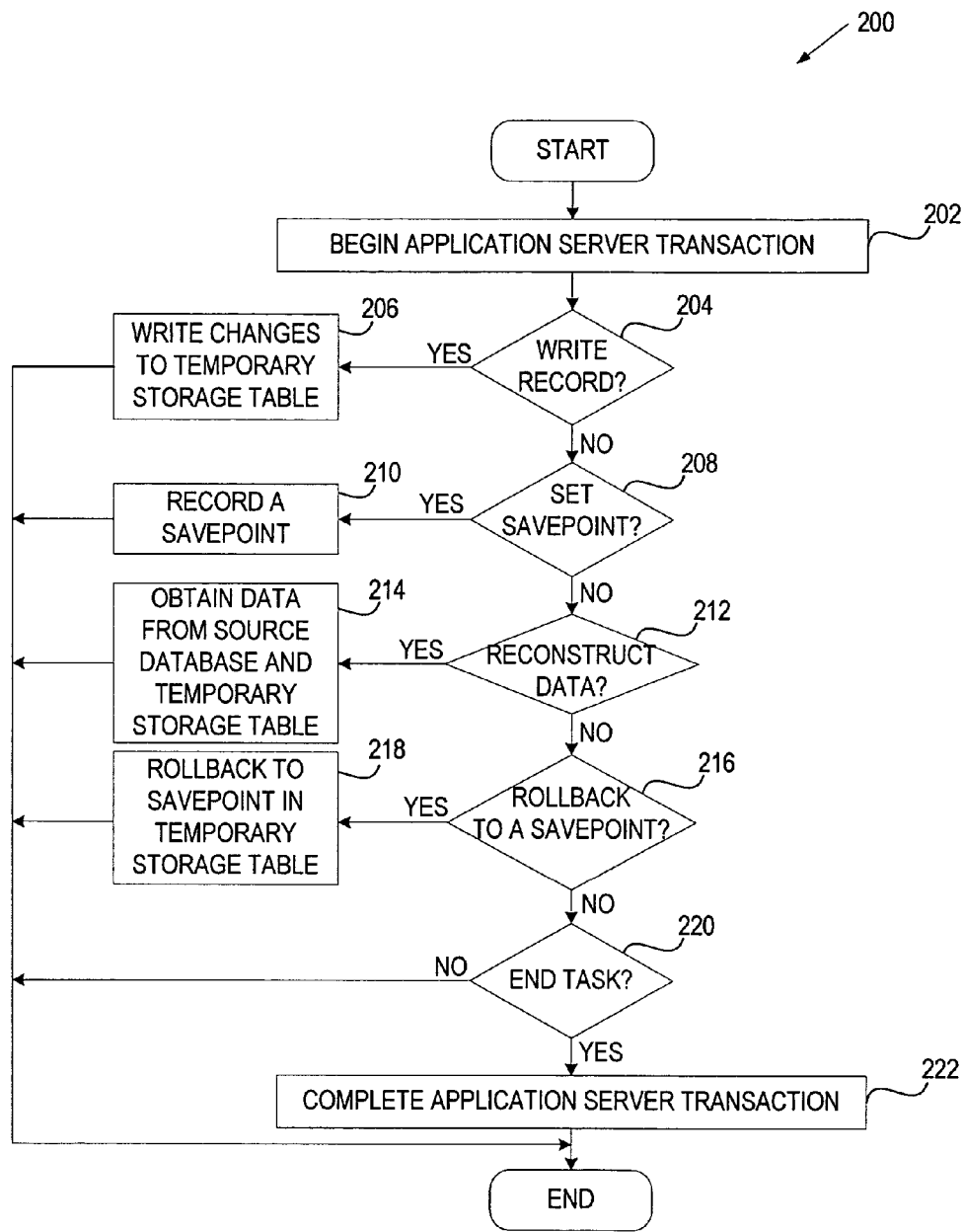
FIG. 2 is a flow diagram of one embodiment of a method for facilitating long-lived data transactions.

FIG. 2 is a flow diagram of one embodiment of a method 200 for facilitating long-lived data transactions. The method may be performed by processing logic that may comprise hardware (e.g., circuitry, dedicated logic, etc.), software (such as run on a general purpose computer system or a dedicated machine), or a combination of both. Processing logic may reside in the object manager 104 of FIG. 1.

Referring to FIG. 2, method 200 begins with processing logic starting a data transaction (block 202). In one embodiment, processing logic starts a data transaction upon receiving a data operation request from an application server. In one embodiment, processing logic receives the data operation request with an identifier of a currently running task. In one embodiment, upon receiving the data operation request, processing logic accesses a temporary storage table to determine whether this task is a new task. If so, processing logic creates a new task context in an in-memory cache. If not (e.g., if the task has been previously paused and is now resumed), processing logic loads the task context from the temporary storage table to create an image of records of the temporary storage table in the in-memory cache.

At block 204, processing logic determines whether the data operation request is a write request (e.g., an update, insert or delete request). If so, processing logic writes the requested changes to the temporary storage table (block 206). One embodiment of a method for performing a write request is discussed in more detail below in conjunction with FIG. 4.

If the data operation request is not a write request, processing logic determines whether the data operation request is a set savepoint request (block 208). If so, processing logic sets a savepoint in the temporary storage table (block 210). In one embodiment, a savepoint indicates the end of a sub-task and the start of a new sub-task. Each sub-task may contain one or more steps and be identified by a number. In one embodiment, in which savepoint/subtask numbers are incremental throughout the task execution path, processing logic sets a savepoint to the last subtask number, increments the last subtask number by one, and records a new subtask with the incremented subtask number.

If the data operation request is not a set savepoint request, processing logic determines whether the data operation request is a reconstruct data request (block 212). If so, processing logic reconstructs requested data using both the temporary storage table and a source database (block 214). One embodiment of a method for reconstructing data is discussed in more detail below in conjunction with FIG. 5A.

If the data operation request is not a reconstruct data request, processing logic determines whether the data operation request is a savepoint rollback request (block 216). If so, processing logic rolls back to the specified savepoint in the temporary storage table (block 218). One embodiment of a method for performing a savepoint rollback request is discussed in more detail below in conjunction with FIG. 8.

If the data operation request is not a savepoint rollback request, processing logic determines whether the data operation request is an end task request (block 220). If so, processing logic completes the data transaction by performing a rollback or commit to the source database (block 214). One embodiment of a method for performing an end task request is discussed in more detail below in conjunction with FIG. 7.

The temporary storage table may contain such columns as a task ID, a savepoint/subtask number, a data operation (e.g., insert, delete, update), and a row ID. The row ID is a unique identifier generated for each row in the tables of the source database. In addition, in one embodiment, the temporary storage table contains a large number of columns that can be mapped to various tables in the source database. In one embodiment, these mappings are stored in a mapping table. The mapping table includes such columns as a task column name, a source column name, a source table name, etc. The task column name column holds column names from the temporary storage table. The source table name column holds corresponding column names from tables in the source database. The source table name column holds names of tables from the source database.

As discussed above, the temporary storage table contains a large number of columns to be mapped to columns in the source database tables. In one embodiment, these columns of the temporary storage table cover all possible types of columns in the source database tables. These types may include, for example, DATETIME, NUMBER, VARGRAPHIC, CLOB, and VARCHAR of different length (e.g., VARCHAR2(1), VARCHAR2(5), VARCHAR2(15), VARCHAR2(20), VARCHAR2(30), VARCHAR2(50), VARCHAR2(75), VARCHAR2(100), VARCHAR2(150), VARCHAR2(255), VARCHAR2(1024) and VARCHAR2 (1999)). The temporary storage table may include one or more columns for each of the above types, depending on the number of corresponding columns in the source database tables.

In one embodiment, when a column of a source database table is processed for a task instance for the first time, a mapping for this column is created and stored in a mapping table. In one embodiment, this column is mapped to a column in the temporary storage table that has the same type and the same or greater length. The recorded mapping is then used every time the column is processed within the task instance. Once the task instance is completed, the mapping is purged. In one embodiment, the contents of the temporary storage table are deleted immediately. Alternatively, the deletion is performed through a server process that deletes purged temporary data periodically.

Figure 3:
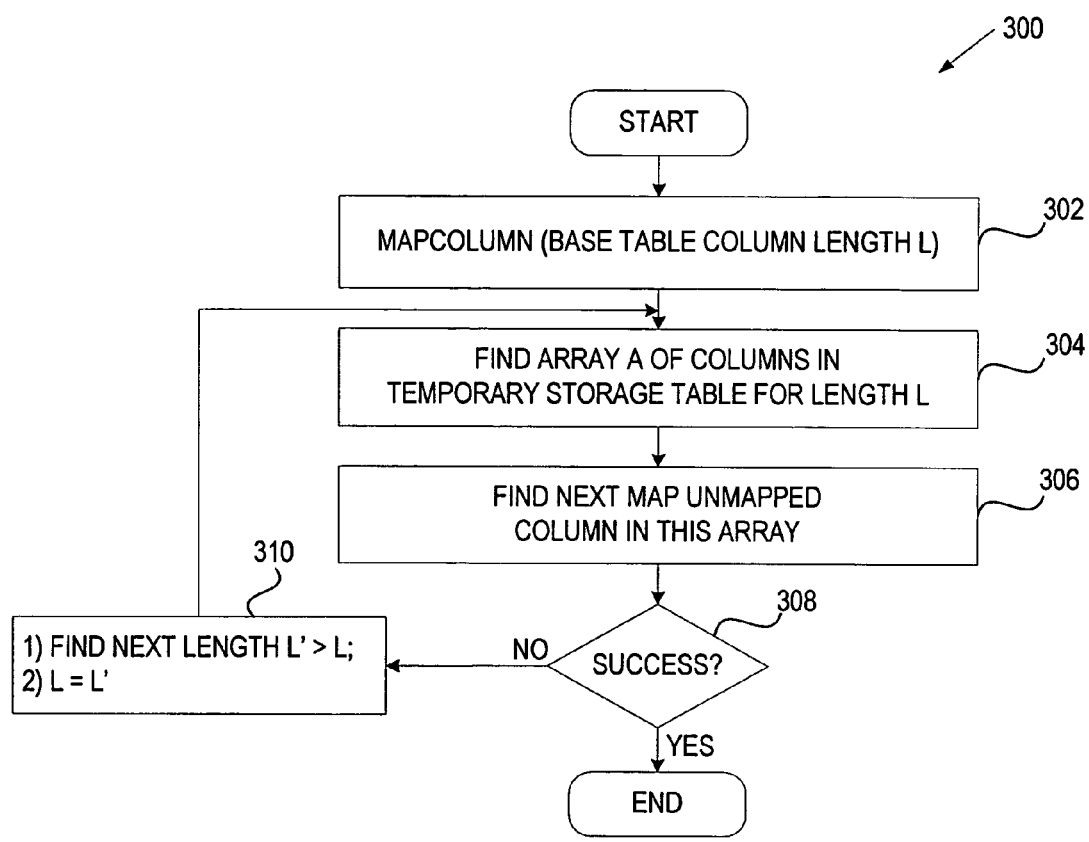
FIG. 3 is a flow diagram of one embodiment of a method for mapping columns of a temporary storage table to columns of source database tables.

FIG. 3 is a flow diagram of one embodiment of a method 300 for mapping columns of a temporary storage table to columns of source database tables. The method may be performed by processing logic that may comprise hardware (e.g., circuitry, dedicated logic, etc.), software (such as run on a general purpose computer system or a dedicated machine), or a combination of both. Processing logic may reside in the object manager 104 of FIG. 1.

Referring to FIG. 3, method 300 begins with processing logic receiving a request to map a column from a source database table (block 302). The request includes the type and length L of a column from a source database table (referred to as a base table).

At block 304, processing logic finds an array A of columns in a temporary storage table that have the same type and length L.

At block 306, processing logic finds a next column in array A that has not been previously mapped. If such a column is found (block 308), processing logic records the mapping in a mapping table. Otherwise, processing logic finds a next length L' that is greater than L, sets L to L' (block 310), and returns to block 304.

Figure 4:
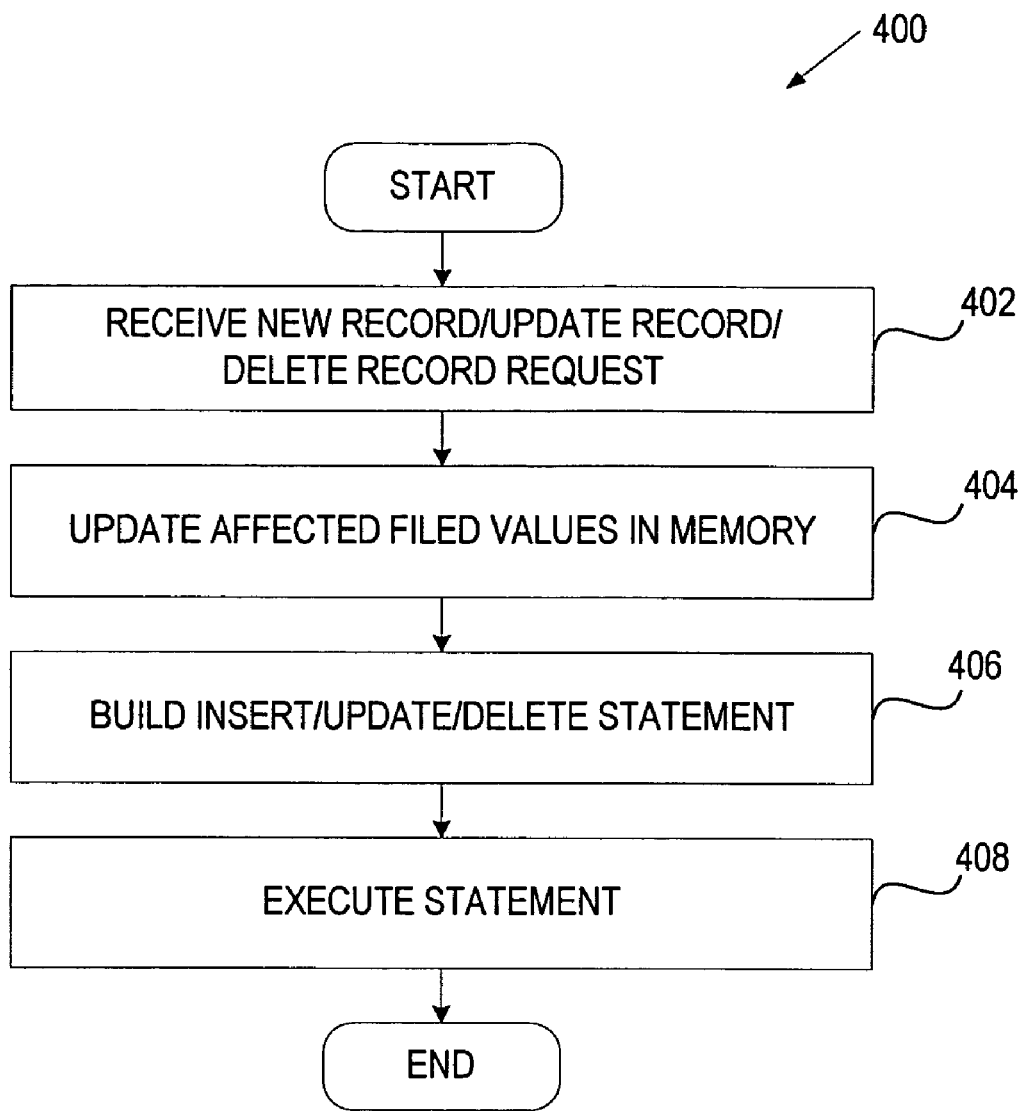
FIG. 4 is a flow diagram of one embodiment of a method for performing a write request.

FIG. 4 is a flow diagram of one embodiment of a method 400 for performing a write request. The method may be performed by processing logic that may comprise hardware (e.g., circuitry, dedicated logic, etc.), software (such as run on a general purpose computer system or a dedicated machine), or a combination of both. Processing logic may reside in the object manager 104 of FIG. 1.

Referring to FIG. 4, method 400 begins with processing logic receiving a new write request (block 402). The new write request may be an insert, delete or update request.

At block 404, processing logic modifies the task context in an in-memory cache to update (or adds) field values affected by the request.

At block 406, processing logic builds an insert, update or delete statement in accordance with the request.

At block 408, processing logic executes the statement to insert, update or delete a relevant record in the temporary storage table.

Figure 5A:
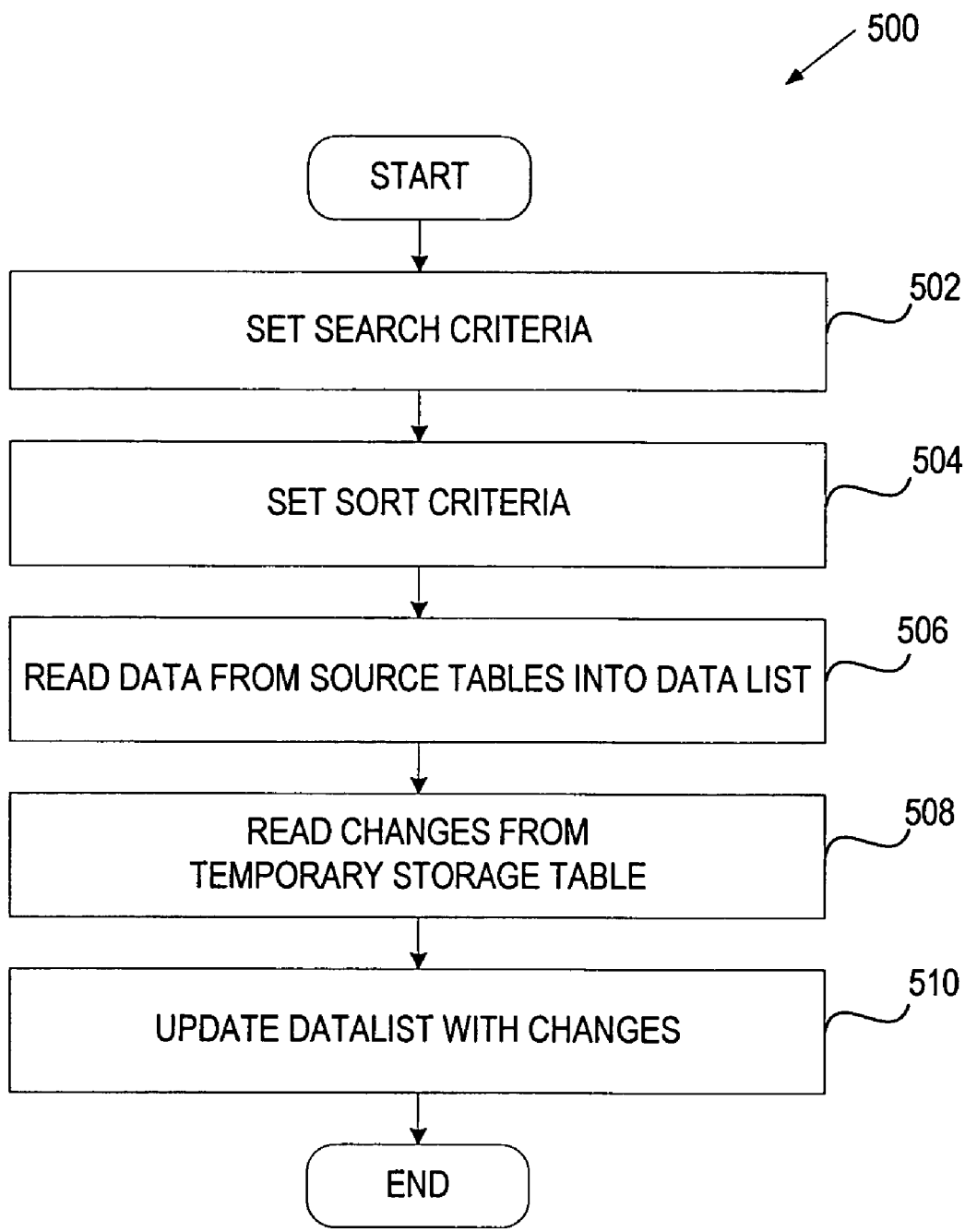
FIGS. 5A and 5B are flow diagrams of two embodiments of a method for reconstructing data.
Figure 5B:
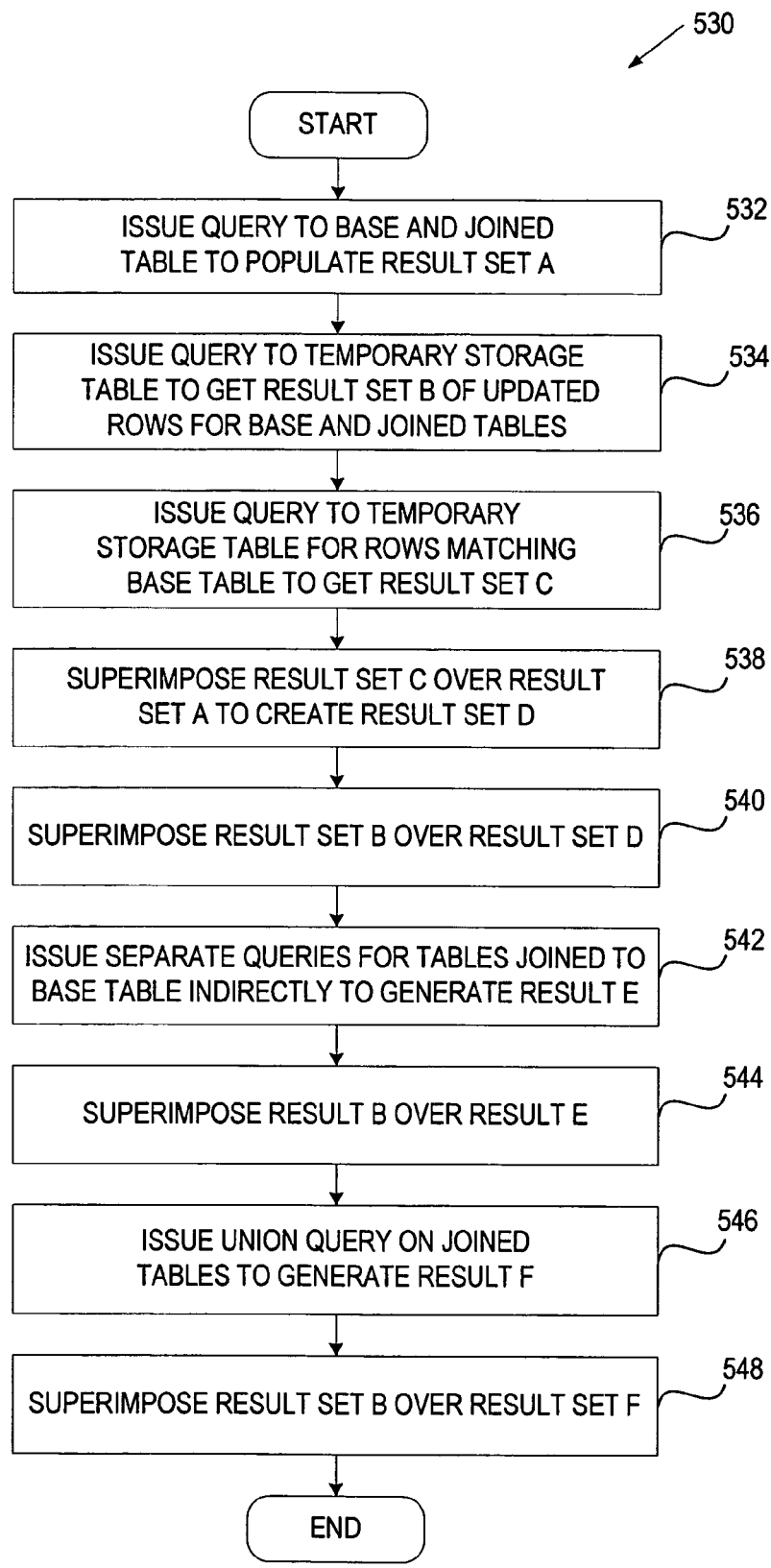

FIGS. 5A and 5B are flow diagrams of two embodiments of a method for reconstructing data. The method may be performed by processing logic that may comprise hardware (e.g., circuitry, dedicated logic, etc.), software (such as run on a general purpose computer system or a dedicated machine), or a combination of both. Processing logic may reside in the object manager 104 of FIG. 1.

Referring to FIG. 5A, method 500 begins with processing logic setting a search criteria based on a data reconstruction request (block 502). The search criteria specify which records should be retrieved.

At block 504, processing logic sets sort criteria to specify the order of retrieved records.

At block 506, processing logic reads data from the source database into a datalist based on the search and sort criteria.

At block 508, processing logic reads, from the temporary storage table, changes occurred during the task that satisfy the search criteria.

At block 510, processing logic updates the datalist with the above changes from the temporary storage table.

As discussed above, in one embodiment, the object manager 104 manipulates data using business components and business objects. A business component is a logical entity that associates columns from one or more tables into a single structure. The table in the source database that the business component is based on is referred to herein as the base table. The base table may have one or more joined tables, which in turn may be joined directly or indirectly with other tables in the chain. A join may have single or multiple joining conditions (join specification). Accordingly, when reconstructing data within the task, a merge should be performed on data retrieved from the base and joined tables and the temporary storage table. A problem may arise if in addition to data values, values of the source fields used to join to other tables may have been changed (e.g., for all tables that are joined, it must be ensured that the joining is to the correct row). In addition, if the search specification is on a joined field, there might be rows that become qualified due to the fact that the joined column that is part of the search specification has changed within the task. Method 530 illustrated in FIG. 5B addresses the above challenges.

Referring to FIG. 5B, method 530 begins with processing logic issuing a query to the base and joined tables to populate an initial result set A (block 532).

At block 534, processing logic issues a query on the temporary storage table to obtain a result set B of the updated rows for the base and joined tables. Alternatively, this query is not used, and an in-memory cache storing all updates made in the task is used instead to obtain the result set B.

At block 536, processing logic issues a query to the temporary storage table for rows matching the base table to obtain the result set C. This query may also join the temporary storage table to all joined tables to get the data for new records, as well as correct joined field values for records where one of the source fields of the join was changed within the task. Using the design of the temporary storage table discussed above, a single query can be used to get values for all directly joined tables. A direct join is a join of one table to the primary key of another table, where the primary key contains a single column.

At block 538, processing logic superimposes the result set C over the result set A, resulting in set D.

At block 540, processing logic superimposes the result set B over the result set D.

At block 542, processing logic issues separate queries for tables joined to the base table indirectly (with greater than one 1 level of join or with greater than one join specification only for records where one of the source fields for these joins has changed) to obtain result E. Alternatively, if the joined record is stored entirely in the temporary storage table (e.g., if the joined record was created during the task), this query may not be issued, and the data may be instead obtained from the in-memory cache. Since, the number of indirectly joined tables is a fraction of the number of directly joined tables, a minimal number of row-by-row queries should be executed.

At block 544, processing logic superimposes the result set B over the result E.

If the search specification involves a column from a joined table, there might be rows that become qualified due to the fact that the joined column that is part of the search specification was changed within the task. Ignoring the search specification on joined fields in the query and instead performing in-memory search evaluation will result in retrieving several hundred unnecessary records from the database that will be filtered in memory, thus affecting end user response time. Therefore, processing logic starts with the outermost joined table that has the search specification and work backwards to join to the base table. In particular, processing logic issues a UNION query on the joined tables in the chain to generate a result set F (block 546). The UNION query may include the search criteria as well as join conditions from the immediate joined table.

At block 546, processing logic superimposes the result set B over the newly qualified records in the result set F.

Next, in one embodiment, processing logic evaluates all rows in the in-memory cache to validate that they still satisfy the search specification. For joins that fetch many rows, processing logic may apply each permutation of the Cartesian (or direct) product to find the first row that satisfies the search specification. Processing logic also drops rows marked deleted in the temporary storage table.

As discussed above, the same record may be modified within the task as well as outside the context of the task. In one embodiment, the behavior of the object manager 104 on query or final commit of such records to permanent storage is configurable. The task may be configured to abort or accept the changes made in the task.

Figure 6:
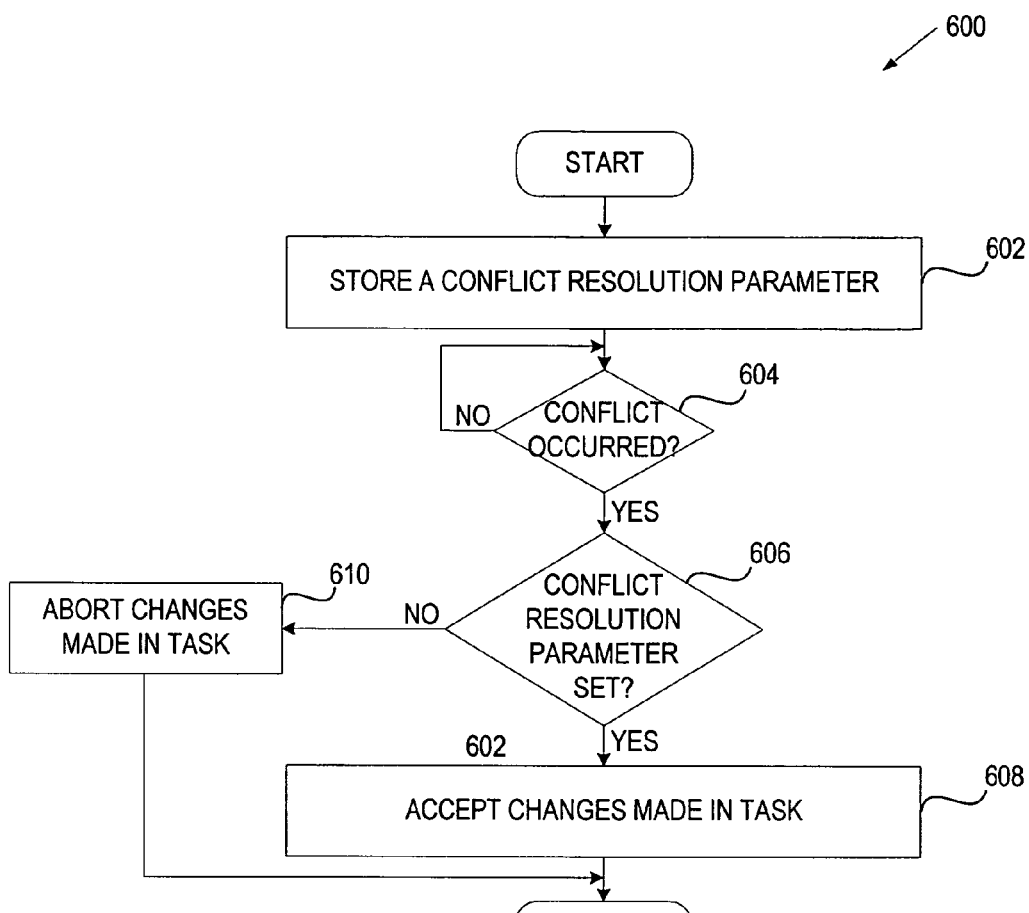
FIG. 6 is a flow diagram of one embodiment of a method for resolving conflicts.

FIG. 6 is a flow diagram of one embodiment of a method 600 for resolving conflicts. The method may be performed by processing logic that may comprise hardware (e.g., circuitry, dedicated logic, etc.), software (such as run on a general purpose computer system or a dedicated machine), or a combination of both. Processing logic may reside in the object manager 104 of FIG. 1.

Referring to FIG. 6, method 600 begins with processing logic storing a conflict resolution parameter (block 602). The conflict resolution parameter indicates whether changes made within a task on a record also modified outside the task should be aborted or accepted.

Upon detecting a conflict (block 604), processing logic determines whether the conflict resolution parameter is set (block 606). If not, processing logic aborts the changes made in the task (block 610) and raises an error. Based on this error, the user is notified that the task is being cancelled because another user has changed the data.

If so, processing logic accepts changes made in the task (block 608). In particular, in one embodiment, when the field changed in the task is different from the field changed by another user then the field change made by another user is not overwritten. When the field changed in the task is the same field that was changed by another user, then the task change overwrites the change of the other user. In particular, if the task is creating a new parent record, then there will be no data conflict on commit. If the task is creating a new child record, then the child record may be appended. If the task data is changed by another user, the source database data may be overwritten by the task data. If the task data deletes an existing record, the delete operation may succeed. If the task data being modified or added (as a child record) is deleted by another user, the commit may fail, and the user may be asked to cancel and restart the task.

Figure 7:
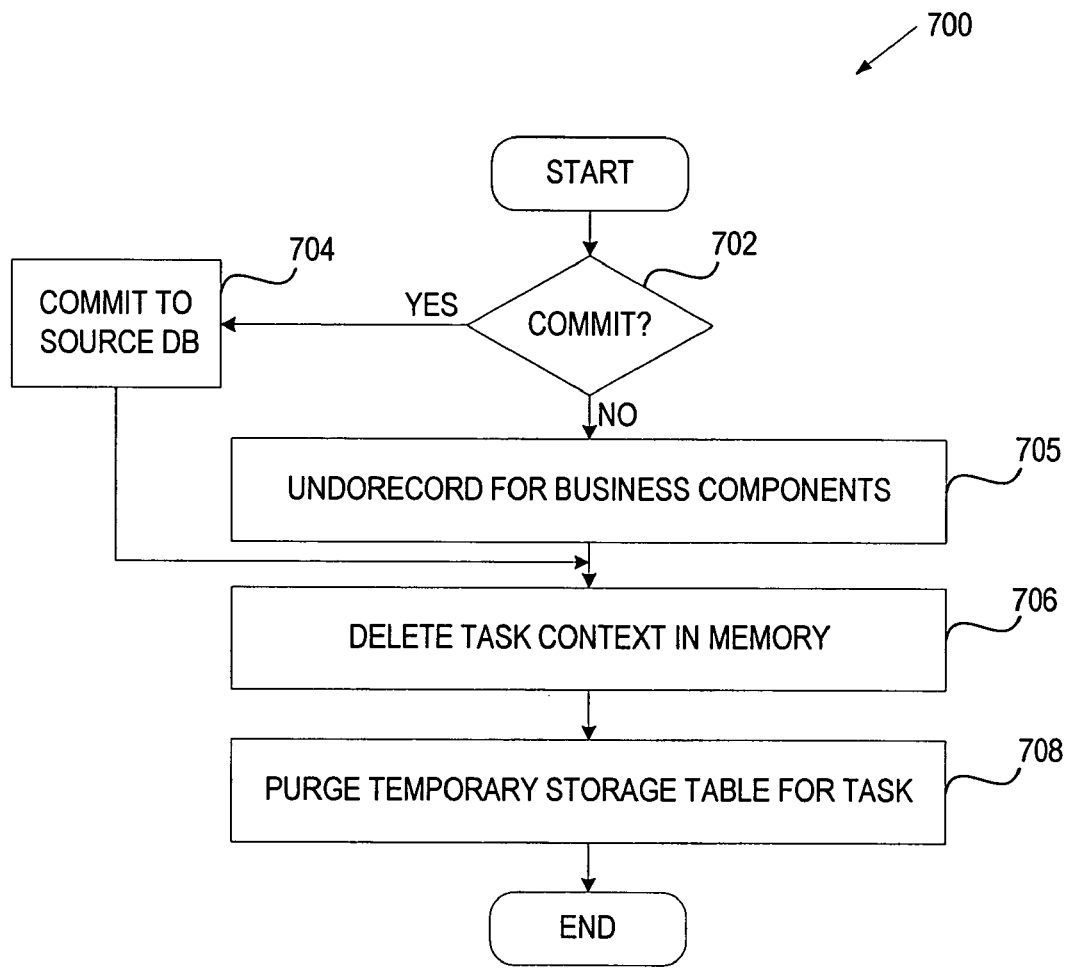
FIG. 7 is a flow diagram of one embodiment of a method for performing an end task request.

FIG. 7 is a flow diagram of one embodiment of a method 700 for performing an end task request. The method may be performed by processing logic that may comprise hardware (e.g., circuitry, dedicated logic, etc.), software (such as run on a general purpose computer system or a dedicated machine), or a combination of both. Processing logic may reside in the object manager 104 of FIG. 1.

Referring to FIG. 7, method 700 begins with processing logic determining whether the end task request is associated with a commit or rollback (block 702).

If the user ends the task with a commit operation, processing logic commits changes stored in the temporary storage table to the source database (block 704) and proceeds to block 706.

If the user ends the task with a rollback operation, processing logic performs an UndoRecord operation for business components maintained within the task (block 705) and proceeds to block 706.

At block 706, processing logic deletes task context in an in-memory cache.

At block 708, processing logic purges the contents of the temporary storage table for the current task.

Figure 8:
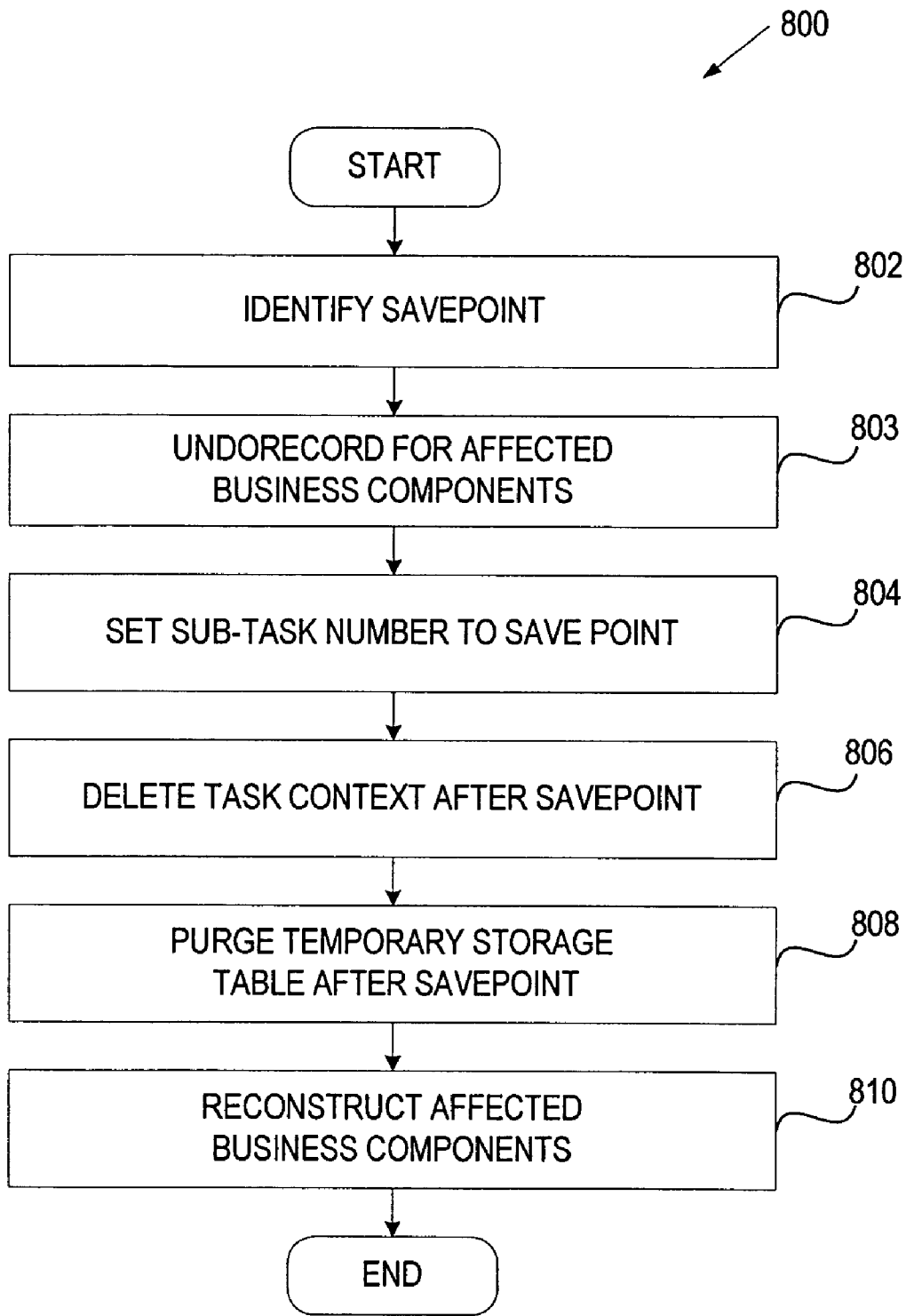
FIG. 8 is a flow diagram of one embodiment of a method for performing a savepoint rollback request.

FIG. 8 is a flow diagram of one embodiment of a method 800 for performing a savepoint rollback request. The method may be performed by processing logic that may comprise hardware (e.g., circuitry, dedicated logic, etc.), software (such as run on a general purpose computer system or a dedicated machine), or a combination of both. Processing logic may reside in the object manager 104 of FIG. 1.

Referring to FIG. 8, method 800 begins with identifying a savepoint based on its number or ID provided in the savepoint rollback request (block 802).

At block 803, processing logic performs an UndoRecord operation for business components modified after the specified savepoint.

At block 804, processing logic sets a subtask number to the specified savepoint.

At block 806, processing logic deletes task context after the savepoint in the in-memory cache.

At block 808, processing logic purges contents of the temporary storage table after the savepoint.

At block 810, processing logic reconstructs business components modified after the savepoint.

In one embodiment, changes are stored in the temporary storage table using incremental cumulative snapshot approach rather than transaction approach because several operations are often executed on the same record within a task. Incremental cumulative snapshot approach combines all the operations on the same record into one, while the transactions approach records each operation one by one. Using incremental cumulative snapshot allows only one record to be saved in the generic storage for the long-lived transaction, thus saving resources and applying changes only once at the final commit time.

The incremental cumulative snapshot approach does not conflict with operation sequence because there is no need to re-play the operations in the original order since transactions are not used. False duplicate conflicts can happen depending on the order of writing to base tables at the committing time. In one embodiment, conflict ID is temporarily set if a false duplicate conflict occur, and is reset back at the end.

Another issue may arise in case of secondary operations. Secondary operations are those business component operations triggered from other business component operations through programmatic business logic. In one embodiment, secondary operations are logged into the temporary storage table, and the object manager ensures that no such business logic is triggered when data is committed from the temporary storage table to the source database.

In some embodiments, the mechanism for facilitating long-lived data transactions discusses herein is used in building wizard-style, guided user interfaces (UIs) for accomplishing business tasks. A business task may support a variety of different processes including, for example, filling out objectives, applying for a loan, conducting a survey, qualifying a lead, approving expense reports, etc. The wizard-style task UI is a sequence of task specific UI views that lead an end user to perform process-centric work that may include applying business logic, evaluating conditional fields, external system integration, etc. The result is an improved end-user experience with shorter learning curves and higher task completion rates.

Figure 9:
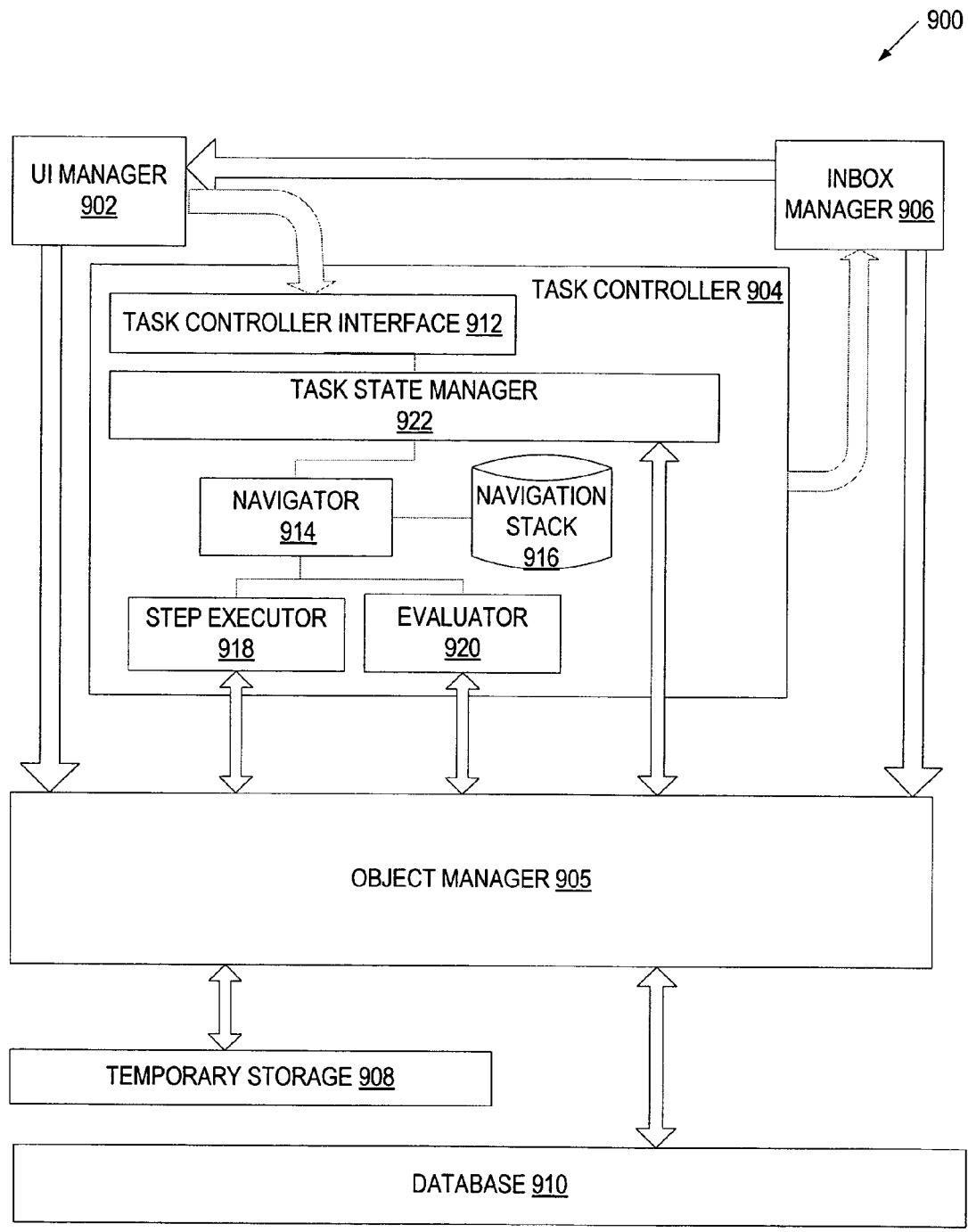
FIG. 9 is a block diagram of one embodiment of a system for building wizard-style UIs for business tasks.

FIG. 9 is a block diagram of one embodiment of a system 900 for building wizard-style UIs for business tasks. The system 900 provides navigation support for walking end users through UI sequences. In particular, end users can progress through tasks by entering data in the UI view and pressing the Next button to move to the next view. End users can also navigate backward in the task (Previous button), modifying previously entered data if desired, then navigating forward again via the Next button. In one embodiment, at the last step in the task, an end user can use the Submit button to commit the task data to the main database tables.

In one embodiment, the system 900 performs business operations and dynamically controls view sequencing as the task progresses. This allows the execution of the flow to be dynamically modified based on data entered by the end user during the task. The system 900 can support several types of operations, including, for example, database accesses, business service calls, subtask steps, and decision steps. Since these operations are performed automatically, rather than by an explicit user actions such as button presses, the end user no longer needs to know when to press particular buttons or in which order.

In one embodiment, changes to business data made as part of a task are not committed to the main database until the end-user has successfully completed the task. New and modified data is kept separate from the main database data and is visible only while the task is executing and only to the end user running the task. When the end user completes the task, all data is committed to the main database and made visible to other users in the enterprise.

In one embodiment, the system 900 allows an end user to pause a task (e.g., using the Pause button) and resume it at a later time. In one embodiment, paused tasks are displayed in the user's Inbox. The Inbox may support resuming paused tasks and transferring tasks to other users. Once the task is transferred, it appears in the Inbox of the user it was transferred to.

In one embodiment, the system 900 allows an end user 112 to cancel the task (e.g., using the Cancel button) being run by reverting all changes made during the current session and restoring the task to its last paused state. In one embodiment, a task can be deleted entirely from the Inbox, discarding all the work done in the task.

In one embodiment, tasks may operate either as standalone entities, or as an integral part of an overarching business process. For example, a Change Contact Address task is a standalone task because it is a self-contained unit of work initiated by the end user. Another exemplary standalone task initiates a business process upon its completion. For example, a Create Expense Report task may initiate a business process for approving the expense report and paying the expenses. Yet another exemplary standalone task may be embedded in the business process as a Task Step. The Task Step may assign a task to an end user by placing an entry in the user's Inbox where the user can launch it. The business process may wait until the end-user runs and completes the task, at which point the business process would be resumed.

In one embodiment, the system 900 includes a UI manager 902, an Inbox manager 906, a task controller 904, an object manager 905, a temporary storage 908 and a main database 910.

The UI manager 902 is responsible for rendering and presenting wizard-style task UIs to end users, and communicating the end user input to the object manager 905 and task controller 904.

The Inbox manager 906 is responsible for controlling new and paused tasks stored in users' Inboxes.

The task controller 904 is responsible for analyzing metadata pertaining to the task and the end user input, and executing flow and business logic based on this analysis to guide the end user through the business task.

In one embodiment, the metadata is created by a task UI development tool, a declarative tool that allows intermediate users (e.g., business analysts, software developers, etc.) to design wizard-style U's for business tasks without writing any code. The tool enables intermediate users to specify steps of a business task and the execution flow for the steps. The steps may include, for example, UI view steps, database operation steps, decision steps, service (external and/or internal) invocation steps, etc. The tool may be a graphical editor that allows an intermediate user to create a visual representation of a task (e.g., as a flowchart) that reflects the task steps and their execution flow. The tool may enable a intermediate user to define navigation controls for UI view steps of the task. These navigation controls may include, for example, Next/Previous buttons, Pause button, Cancel button, etc. The tool may also allow an intermediate user to specify properties for the task (e.g., the name of the task, transactional behavior, fields to be entered by an end user for a UI view step, database fields to be updated for a database operation step, branching conditions for a decision step, the name of a service to be called for a service invocation step, etc.). The tool may convert the visual representation of the task and the task properties into a collection of metadata that may be represented, for example, using an XML document based on an XML schema.

The temporary storage 908 stores data associated with the task throughout the lifetime of the task. In one embodiment, this data is only visible while the task is executing and only to the end user running the task. In another embodiment, the temporary storage 908 may be shared across multiple tasks and their end users. Once an end user successfully completes the task, the data stored in the temporary storage 908 for this task is committed to the database 910 and becomes visible to other users in the organization.

The object manager 905 provides data management for the task controller 904, Inbox manager 906 and the UI manager 902. In one embodiment, the object manager 905 supports transaction isolation for operations performed within the boundary of a task in a manner transparent to its client components. The object manager 905 stores updates associated with these operations in the temporary storage 908 until the task controller 904 calls the object manager 905 to commit the data to the database 910. The task controller 904 may also call the object manager 905 to set data savepoints and rollback the task data to a savepoint when necessary. In one embodiment, the object manager 905 captures the task business object (BO) state, and provides the functionality to store and retrieve BO state from its serialized image and database 910.

In one embodiment, the task controller 904 includes a task controller interface 912, a navigator 914, a step executor 918, an evaluator 920 and a task state manager 922.

In one embodiment, the task controller interface 912 interacts with the UI manager 902, and invokes appropriate internal components of the task controller 904. In one embodiment, the task controller interface 912 includes one or more APIs to communicate with different entities.

The orchestrator 924 calls the step executor 918 to execute the step activity, and pushes the step instance into a navigation stack maintained by the navigator 914.

The navigator 914 is responsible for performing forward and backward navigation. In one embodiment, when at the decision point, the navigator 914 calls the evaluator 920 to evaluate branch condition criteria and determine the forward path. On forward navigation for all other step types, the navigator 914 may call the step executor 918 to execute the activity represented by the step, and push the stack frame into the navigation stack. Each stack frame may contain a reference to the current business object state. The business object is a collection of data associated with particular UI, including data currently entered by the end user. The navigator 914 restores business object states from the navigation stack for the task views during backward navigation.

In one embodiment, the navigator 914 is responsible for handling subtask navigation using the navigation stack and a call stack, which stores local context for the main business task and each subtask within the main business task.

The task state manager 922 is responsible for maintaining the life cycle of task instances and their states. In addition to the navigation stack, task state encompasses the values of all task variables for the current task instance. In one embodiment, the task state manager 922 maintains the life cycle of a task by enforcing its state transition rules.

An exemplary task execution scenario will now be discussed in more detail with reference to the major components of the runtime engine 900, according to one embodiment of the present invention. The scenario may begin when an end user selects a new or paused task in the Inbox. In response, the Inbox manager 906 calls the UI manager 902, passing the name of the task. The UI manager 902 extracts the task context, and calls the task controller 904 to start a task. Then, the task controller 904 calls the object manager 905 to create the temporary storage 908 for the task. Using the object manager 905, the task controller 904 reads data from the temporary storage 908 and writes data back to the temporary storage 908.

If the next step is a task view step, the task controller 904 exits and returns control to the UI manager 902, passing the name of the next task view. The UI manager 902 renders the task view and stores the user data through the object manager 905 in the temporary storage 908. If the end user activates a navigation control (e.g., by pressing the Next, Previous or Cancel button) in a task UI view, the UI manager 902 calls the task controller 904 passing a navigation operand (e.g., Next, Previous or Cancel). The task controller 904 performs all relevant non-UI related task activities and returns control back to the UI manager 902, providing the name of the subsequent task UI view.

If the user pauses the task, the task controller 904 saves the current task state via the object manager 905 to the database 910, bypassing the temporary storage 908. The UI data remains in the temporary storage. If the user finishes the task, the task controller 904 issues a commit to the object manager 905, which saves the UI data permanently from temporary storage 908 to database 910. Depending on whether the task is paused or completed, the task controller 904 may update or remove the task from the Inbox.

Figure 10:
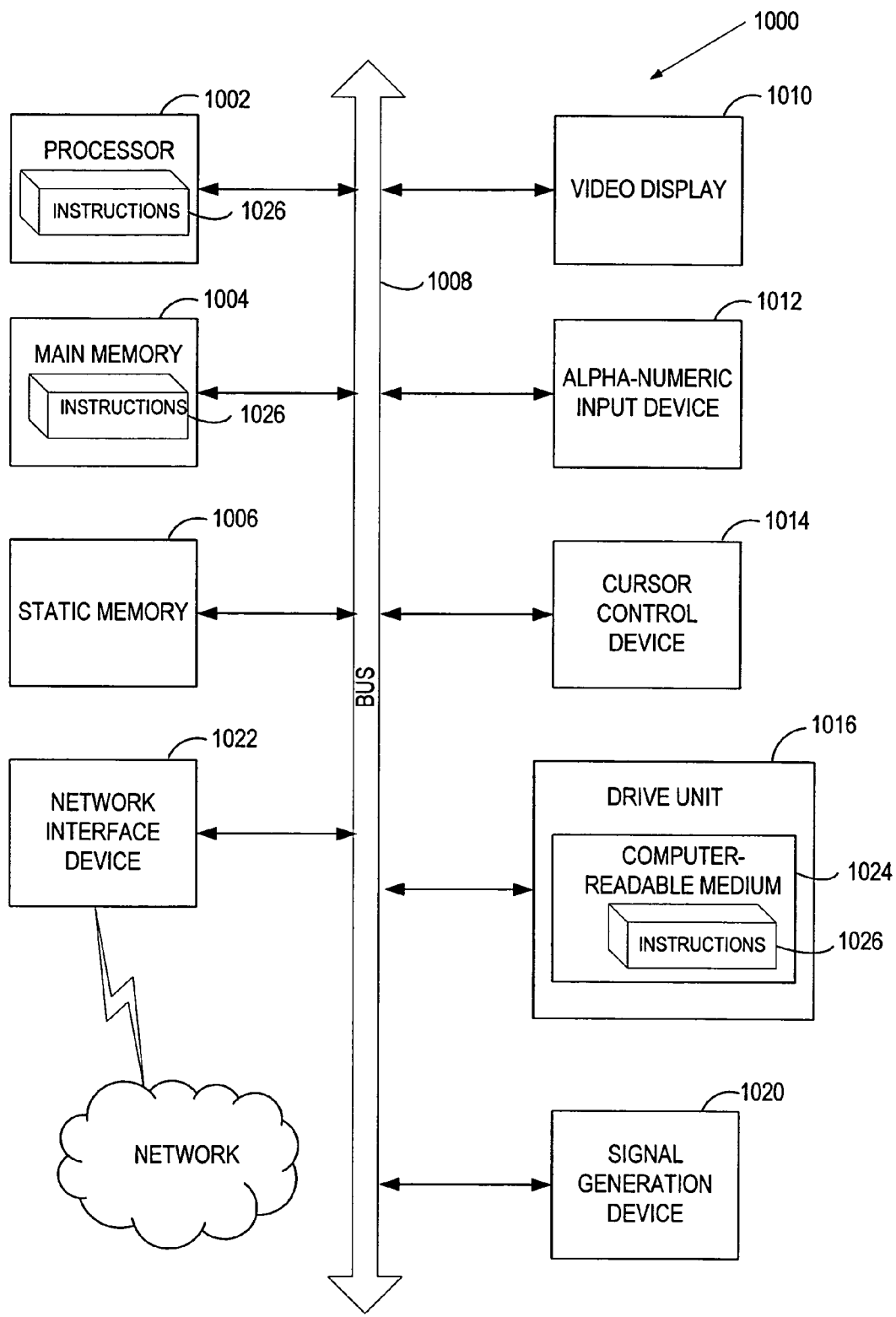
FIG. 10 is a block diagram of an exemplary computer system that may be used to perform one or more of the operations described herein.

FIG. 10 is a block diagram of an exemplary computer system 1000 (e.g., a computer system hosting task controller 204 and/or UI manager 202 of FIG. 2 and/or task UI development tool 102 of FIG. 1) that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1000 includes a processor 1002, a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alpha-numeric input device 1012 (e.g., a keyboard), a cursor control device 1014 (e.g., a mouse), a disk drive unit 1016, a signal generation device 1020 (e.g., a speaker) and a network interface device 1022.

The disk drive unit 1016 includes a computer-readable medium 1024 on which is stored a set of instructions (i.e., software) 1026 embodying any one, or all, of the methodologies described above. The software 1026 is also shown to reside, completely or at least partially, within the main memory 1004 and/or within the processor 1002. The software 1026 may further be transmitted or received via the network interface device 1022. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to include, but not be limited to, solid-state memories, optical and magnetic disks, and carrier wave signals.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A computerized method comprising:

starting a data transaction during a first user session;

storing data associated with the data transaction in a temporary storage table, wherein
the storing the data begins with a start of the data transaction and persists only for a life of the data transaction;

mapping the temporary storage table to database tables in a source database, wherein
the mapping is used to process the data transaction, and
the mapping begins with the start of the data transaction and persists only for the life of the data transaction;

reconstructing data in the source database, wherein
the reconstructing is performed using the temporary storage table and the source database, and the reconstructing comprises:
issuing at least one query to the database tables and joined tables of the database tables to populate at least a first set of data,
issuing at least a second query to the temporary storage table to obtain at least a second set of data, wherein the at least second set of data represents changes to the database tables and the joined tables,
superimposing the at least second set of data over the at least first set of data to generate at least one third set of data, and
reconstructing the data in the source database using the at least one third set of data; and ending the data transaction during a second user session using contents of the temporary storage table.

2. The computerized method of claim 1, wherein the data transaction is started in response to a data operation request of an application server.

3. The computerized method of claim 1, further comprising:
storing mappings of columns in the temporary storage table to columns in the database tables in a mapping table.

4. The computerized method of claim 1, further comprising:
when receiving a user request for a commit operation, committing the data associated with the data transaction from the temporary storage table to the source database and deleting the data associated with the data transaction from the temporary storage table; and
when receiving a user request for a rollback operation, deleting the data associated with the data transaction from the temporary storage table.

5. The computerized method of claim 1, wherein the data associated with the data transaction is visible to one or more owners of the data transaction and invisible to other users, before the data transaction ends.

6. The computerized method of claim 1, further comprising:
receiving a data reconstruction request for reconstructing the data.

7. The computerized method of claim 6, wherein the reconstructing the data comprises:
identifying search criteria based on the data reconstruction request;
identifying sort criteria for the reconstructing;
reading the data from the source database into a datalist based on the search and sort criteria;
reading changes made to the data from the temporary storage table based on the search criteria; and updating the datalist with the changes from the temporary storage table.

8. The computerized method of claim 1, wherein the data transaction corresponds to a task.

9. The computerized method of claim 8, further comprising:
resolving conflicts between data changes occurred within the task and data changes occurred outside the task based on a conflict resolution parameter.

10. The computerized method of claim 9, wherein the resolving the conflicts further comprises:
accepting the data changes occurred within the task when the conflict resolution parameter is set; and
aborting the data changes occurred within the task when the conflict resolution parameter is not set.

11. The computerized method of claim 1, further comprising:
setting a savepoint in the temporary storage table; and
when receiving a savepoint rollback request, purging at least some of the contents of the temporary storage table after the savepoint.

12. A machine-readable storage medium having machine-executable instructions to cause a machine to perform a method comprising:
starting a data transaction during a first user session;
storing data associated with the data transaction in a temporary storage table, wherein
the storing the data begins with a start of the data transaction and persists only for a life of the data transaction;
mapping the temporary storage table to database tables in a source database, wherein
the mapping is used to process the data transaction, and
the mapping begins with the start of the data transaction and persists only for the life of the data transaction;
reconstructing data in the source database, wherein
the reconstructing is performed using the temporary storage table and the source database, and the reconstructing comprises:
issuing at least one query to the database tables and joined tables of the database tables to populate at least a first set of data,
issuing at least a second query to the temporary storage table to obtain at least a second set of data, wherein the at least second set of data represents changes to the database tables and the joined tables,
superimposing the at least second set of data over the at least first set of data to generate at least one third set of data, and
reconstructing the data in the source database using the at least one third set of data; and
ending the data transaction during a second user session using contents of the temporary storage table.

13. The machine-readable storage medium of claim 12, wherein the data transaction is started in response to a data operation request of an application server.

14. The machine-readable storage medium of claim 12, wherein the method further comprises:
storing mappings of columns in the temporary storage table to columns in the database tables in a mapping table.

15. The machine-readable storage medium of claim 12 further comprising:
when receiving a user request for a commit operation, committing the data associated with the data transaction from the temporary storage table to the source database and deleting the data associated with the data transaction from the temporary storage table; and
when receiving a user request for a rollback operation, deleting the data associated with the data transaction from the temporary storage table.

16. A system comprising:
a computer processor;
a computer memory;
a temporary storage table, stored on the computer memory, to store data associated with a data transaction, wherein
the store the data begins with start of the data transaction and persists only for a life of the data transaction;
a mapping table, stored on the computer memory, to store mappings of the temporary storage table to database tables in a source database, wherein
the mappings are used to process the data transaction, and
the mappings are created at the start of the data transaction and persist only for the life of the data transaction; and
an object manager, executed by the computer processor, for starting the data transaction during a first user session, for ending the data transaction during a second user session using contents of the temporary storage table, and for reconstructing data in the source database, wherein the reconstructing is performed using the temporary storage table and the source database, and the reconstructing comprises:
issuing at least one query to the database tables and joined tables of the database tables to populate at least a first set of data,
issuing at least a second query to the temporary storage table to obtain at least a second set of data, wherein the at least second set of data represents changes to the database tables and the joined tables,
superimposing the at least second set of data over the at least first set of data to generate at least one third set of data, and
reconstructing the data in the source database using the at least one third set of data.

17. The system of claim 16, wherein the object manager starts the data transaction in response to a data operation request of an application server.

18. The system of claim 16, wherein the mapping table stores mappings of columns in the temporary storage table to columns in the database tables of the source database.

19. The system of claim 16, wherein the data associated with the data transaction is visible to one or more owners of the data transaction and invisible to other users, before the data transaction ends.

20. The system of claim 16, wherein the object manager is further for receiving a data reconstruction request to reconstruct the data.

* * * * *

UNITED STATES PATENT AND TRADEMARK OFFICE
CERTIFICATE OF CORRECTION

| | | |
|---|---|---|
| PATENT NO. | : 8,112,394 B2 | |
| APPLICATION NO. | : 11/525680 | |
| DATED | : February 7, 2012 | |
| INVENTOR(S) | : Shringi et al. | |

It is certified that error appears in the above-identified patent and that said Letters Patent is hereby corrected as shown below:

In column 3, line 20, delete "(CD-ROMs)," and insert -- (CD ROMs), --, therefor.

In column 3, line 22, delete "programmamable" and insert -- programmable --, therefor.

In column 3, line 22-23, delete "eletrically" and insert -- electrically --, therefor.

In column 11, line 43, delete "U's" and insert -- UIs --, therefor.

Signed and Sealed this
First Day of May, 2012

David J. Kappos
*Director of the United States Patent and Trademark Office*